(12) United States Patent
Kwiat

(10) Patent No.: US 6,363,496 B1
(45) Date of Patent: Mar. 26, 2002

(54) APPARATUS AND METHOD FOR REDUCING DURATION OF TIMEOUT PERIODS IN FAULT-TOLERANT DISTRIBUTED COMPUTER SYSTEMS

(75) Inventor: Kevin Anthony Kwiat, Whitesboro, NY (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 09/240,189

(22) Filed: Jan. 29, 1999

(51) Int. Cl.[7] .................................................. G06F 11/07
(52) U.S. Cl. ................................................ 714/4; 714/797
(58) Field of Search ......................... 714/2, 3, 4, 47, 714/48, 797; 709/206, 251, 201; 370/901, 908, 912; 713/502

(56) References Cited

U.S. PATENT DOCUMENTS 4,503,535 A * 3/1985 Budde et al.
4,680,753 A * 7/1987 Fulton et al.
4,914,657 A * 4/1990 Walter et al.

* cited by examiner

Primary Examiner—Gopal C. Ray
(74) Attorney, Agent, or Firm—Harold L. Burstyn; Joseph A. Mancini

(57) ABSTRACT

Apparatus and method to reduce the duration of timeout periods in fault-tolerant distributed computer systems. When nodes execute a task redundantly and communicate their results over a network for further processing, it is customary to calculate timeouts on a worst-case basis, thereby prolonging their duration unnecessarily. By applying Tchebychev's inequality, which holds for any statistical distribution, to adaptively determine the distribution of the arrival times of the results at the point where further processing of those results takes place, the duration of timeouts is reduced. Successively refining the statistical distribution of the arrival times leads to an improved forecast of future arrivals. Thus timeouts are kept to a minimum without compromising the reliability of the system.

6 Claims, 7 Drawing Sheets

```
Procedure arrival_times_synchronization_for_processing_results;
  get_result_ready_message_arrival_time;
    while yet_to_process_results = "true" do
      begin
        timeout_limit = d /* set timeout limit (initial d value is default timeout limit) */
        current_time = now; /* save present time */
        wait for next result until current_time + timeout_limit; /* set max waiting time until */
                                                                 /* result arrival */
        if now > current_time + timeout_limit then /* test for timeout prior to a result arrival */
        begin
          process_results(results from working nodes); /* timeout occurred before new arrival */
          yet_to_process_results = "false";
        end
        else
        begin
          get_result_ready_message_arrival_time; /* record time of current arrival */
          if all_results_arrived = "true" then
            begin
              process_results(results from working nodes);
              yet_to_process_results = "false";
            end
          else
          begin
            R= last_arrival_time - first_arrival_time; /* get range */
            mean =(Σ (arrival times))/(number_of_arrivals); /* calculate mean */
            case { number_of_arrivals} is /* find $d_2^*$ value based on number of arrivals */
              when 2 $d_2^*$ = 1.41;  when 3 $d_2^*$ = 1.91;  when 4 $d_2^*$ = 2.24
              when 5 $d_2^*$ = 2.48;  when 6 $d_2^*$ = 2.67;  when 7 $d_2^*$ = 2.83
              when 8 $d_2^*$ = 2.96;  when 9 $d_2^*$ = 3.08 ; when 10 $d_2^*$ = 3.18
              when 11 $d_2^*$ = 3.27; when 12 $d_2^*$ = 3.35; when 13 $d_2^*$ = 3.42
              when 14 $d_2^*$ = 3.49; when 15 $d_2^*$ = 3.55
            end case
            d = mean + k x $\bar{R}$/ $d_2^*$; /* set new waiting period d based on forecasting */
          end; end; end;
          {failed nodes} = {nodes with no result_arrival_time }; /* failed to send result_ready msg */
end arrival_times_synchronization_for_processing_results.
```

Figure 3

| INSTRUCTION | LATENCY |
|---|---|
| Addition | 2 |
| Subtraction | 2 |
| Multiplication | 3 |
| Division | 15 |
| Square Root | 25 |

Figure 5

```
Procedure arrival_times_synchronization_for_processing_results;
  get_result_ready_message_arrival_time;
    while yet_to_process_results = "true" do
      begin
        timeout_limit = d /* set timeout limit (initial d value is default timeout limit) */
        current_time = now; /* save present time */
        wait for next result until current_time + timeout_limit; /* set max waiting time until */
                                                                 /* result arrival */
        if now > current_time + timeout_limit then /* test for timeout prior to a result arrival */
        begin
          process_results(results from working nodes); /* timeout occurred before a new */
          yet_to_process_results = "false";            /* arrived */
        end
        else
        begin
          get_result_ready_message_arrival_time; /* record time of current arrival */
          if all_results_arrived = "true" then
            begin
              process_results(results from working nodes);
              yet_to_process_results = "false";
            end
          else
WI        begin  /* This part of the procedure computes the waiting interval – it is labeled WI */
            R̄= last_arrival_time - first_arrival_time; /* get range */
            mean =(Σ (arrival times))/(number_of_arrivals); /* calculate mean */
            case {number_of_arrivals} is /* find $d_2^*$ value based on number of arrivals */
              when 2 $d_2^*$ = 1.41; when 3 $d_2^*$ = 1.91; when 4 $d_2^*$ = 2.24; when 5 $d_2^*$ = 2.48
              when 6 $d_2^*$ = 2.67; when 7 $d_2^*$ = 2.83; when 8 $d_2^*$ = 2.96; when 9 $d_2^*$ = 3.08
              when 10 $d_2^*$ = 3.18; when 11 $d_2^*$ = 3.27; when 12 $d_2^*$ = 3.35; when 13 $d_2^*$ = 3.42
              when 14 $d_2^*$ = 3.49; when 15 $d_2^*$ = 3.55
            end case
            d = mean + k x R̄/ $d_2^*$; /* set new waiting period d based on forecasting */
            if ∃ arrival time < (mean – d) then /* check for premature arrivals */
            begin
              first_arrival_time = earliest arrival time that is ≥ (mean – d)
              {arrival times} = {arrival times ∋ each arrival time ≥ first_arrival_time} /*update set*/
                                                                                         /* of arrival times */
              number_of_arrvials = |{arrival times}| /* update cardinality of set of arrival times */
              resume at label WI /* refine waiting interval based on detection of premature arrival */
            end;   end;   end;   end;
        {failed nodes} = {nodes with result_arrival_time ∉ {arrival times}}; /* no result_ready */
end arrival_times_synchronization_for_process_results. /* message or too soon */
```

Figure 6

APPARATUS AND METHOD FOR REDUCING DURATION OF TIMEOUT PERIODS IN FAULT-TOLERANT DISTRIBUTED COMPUTER SYSTEMS

STATEMENT OF GOVERNMENT INTEREST

The invention described herein may be manufactured and used by or for the Government for governmental purposes without the payment of any royalty thereon.

BACKGROUND OF THE INVENTION

The present invention relates to a fault-tolerant distributed computer system, and, in particular, to a distributed computer system that relies upon timeout to detect if a component of the system has failed. That is, when the system waits more than a certain period of time for an action to occur, it declares something is wrong. The present invention makes use of statistical methods to improve the system's timeliness by reducing the duration of the waiting period prior to the system issuing a timeout.

Distributed computer systems consist of individual computers interconnected by a network. The individual computers cooperate in executing a common program by exchanging messages over the network. The individual computers are called "the computing nodes" or simply "the nodes". The distributed computer system itself is called "a distributed system". In a fault-tolerant distributed system the distributed program continues to execute its instructions even if some nodes fail.

A node may fail by simply ceasing to execute instructions. Since it does not send spurious or corrupted information over the network, other nodes cannot sense the failure. The failed node merely remains silent by not responding to messages sent to it by other nodes. No response to a message shows the sending nodes that the receiving node has failed. However, even nodes that have not failed do not respond instantaneously. Transmission delays in the network account for some lack of responsiveness. Delays can be further compounded if messages are service requests that the receiver satisfies with its response.

Since absence of a response is insufficient for deciding that the receiving node has failed, the sending node has to set a limit on the time it will wait. This wait is called a timeout period. If the timeout period passes without the anticipated action, then a timeout has occurred.

Deciding how long the timeout period should be is critical to the overall operation of the distributed system. Too short a timeout period, when operating nodes prolong their responses merely because of a heavier-than-normal workload, can cause the system to regard a node as failed. Too long a timeout period allows a failed node to suspend system operation until the timeout occurs.

Watchdog timers, as described by Johnson (*Design and Analysis of Fault-Tolerant Digital Systems*, Addison Wesley, 1989, Pages 68–69) and Lee and Anderson (*Fault Tolerance Principles and Practice*, $2^{nd}$ Edition, Springer-Verlag, 1990, Pages 104–105), enable a timeout. To detect a lack of response, timing checks are imposed on tasks at mandatory intervals during execution. Prior to the end of each interval, receipt of an "I am alive" message is expected. The watchdog timer is set to a value that corresponds to the expected execution time until the next "I am alive" message. There has to be leeway to compensate for slight variations in execution time within an interval. But it is easier to estimate the expected variation in several small intervals during the task than to estimate when the entire task should be completed. As more time passes prior to a timing check, the longer will a processor executing a task be exposed to factors that cause it to drift from what might be "expected." (Note that expectation here is not the mathematical expectation that corresponds to the mean of a statistical distribution. Instead its connotation is what the system designer believes is reasonable, based on the task's demands for algorithms and resources.)

Watchdog timers ease the constraints on limiting a waiting period. They do so by substituting several small problems, each of which is easier to solve, for the whole problem. But watchdog timers have drawbacks. Sending an "I am alive" message may be difficult unless software was specifically written to support watchdog timers. Even if the software does support watchdog timers, sending a message requires that a task suspend execution, thereby reducing system throughput. In distributed systems, frequent "I am alive" messages create traffic that causes network congestion. System performance suffers, thereby compounding the problem of estimating the shortest practical timeout period.

The prior-art method of watchdog timers thus does not succeed in limiting the timeout period in fault-tolerant distributed systems. One alternative is to permit unbounded message delays, forego automating the calculation of an optimal timeout, and let a human operator detect the lack of system response. However, the comparatively slow reaction of a human eliminates this alternative from consideration for all applications but those few where an operator is present and a rapid response is not required.

Unfortunately the cases are rare where one can accept unbounded message delays. So we require a fault-tolerant distributed system that ensures the existence of an upper bound d on the timeout period for nodes that work properly. See Cristian, "Understanding Fault-Tolerant Distributed Systems," 34 *Communications of the ACM* (February 1991), the disclosure of which is incorporated herein by reference.

To mitigate some unwanted side effects of watchdog timers, designers can reduce the number of timing checks by increasing the intervals between them. Considering only the completion time for the entire task can eliminate intermediate checks. In either case, designers must choose a limit to the length of a timeout period. A timeout's duration is thus based on a designer's assumptions about the real-time behavior of the operating system, the maximum system load, and the application of massive redundancy to the communication hardware. The designer tries to ensure a negligible chance that network partitions will occur as described by Cristian (Ibid.). To avoid making a timeout period too short, it must be based on worst-case scenarios. Even though the worst case may be most unlikely, the prior art treats a conservative approach based on a worst case as superior to risking the inadvertent loss of operating nodes through premature timeout.

Timeout is important for working nodes to detect a node that fails by omitting a response. However, a failed node may send a timely response whose data is corrupted. To cope with such a failure, it is necessary to replicate a particular task on several nodes at the same time. By creating more than a single instance of the task, discrepancies can be detected by comparing the outputs from every node that executes the task. When three or more nodes execute the same task, the correct output is presumed to be the result of a "vote" among them. That is, each node offers its own solution to the task, and the system brings all the solutions together to decide which commands a majority. Each node that executes a redundant task communicates its results to a voter that collates all the results. Making the voter's output represent the majority result from the nodes masks an erroneous result. More than half the results must agree to form a majority.

The voter may be a specially designated node, or it may be distributed among the nodes. At the start of the task, nodes are synchronized so that voting takes place when the task is completed. A centralized voter that has independent connections to the nodes can collect their results in parallel. When the voter is distributed, each node broadcasts its results to the other nodes, so that each node determines the majority.

Timing is critical in voting. If results arrive at the voter at slightly different times, incorrect results can be generated temporarily. In many applications, an incorrect result cannot be allowed for even a very small period. Furthermore, if some of the initial results arrive at a voter simultaneously, a remaining node may be incorrectly declared faulty because its results arrived at the voter after voting took place. For these reasons, it is important to synchronize voting.

Some voting schemes permit unsynchronized nodes. The unsynchronized inputs are first marshaled and then fed simultaneously to the voter so that they appear synchronized. For example, Fletcher et al. (U.S. Pat. No. 3,783,250 issued Jan. 1, 1974, col. 5, line 58ff.) teaches the use of buffer shift registers that allow the nodes supplying the voter inputs to be out of synchronization by as much as one-halfword. Clearly there must be an assumed amount of permissible drift among the nodes, and a limit placed on how much the voter inputs may be unsynchronized. The problem of a failed node that may not respond is addressed by limiting the time spent on marshaling voter inputs. Eventually, through this implicit timeout period, the vote takes place. Hence a fault-tolerant computer system may employ a timeout to prevent having the voter wait indefinitely.

Avoiding indefinite waiting was a problem from the very beginning of distributed computer systems. A sender and a receiver had to cooperate for a distributed program to run. Yet there had to be a way to detect a lack of response. Because the problem arises from a single event (i.e., a response), one could not apply statistical techniques. They require a minimum of two sample values from which to compute a mean and a standard deviation. Timeouts were therefore based on the assumptions of the designer. Later it became necessary in fault-tolerant distributed systems to tolerate nodes that sent corrupted data. Nodes could still fail by stopping, but to mask erroneous data it was necessary to use redundant nodes. The earlier structure of timeouts was simply carried over.

An early innovation in fault-tolerant distributed computing systems was to enforce a time limit on how long a node should wait for another node to respond. This limit was based on anticipating the longest possible delay. Otherwise, too short a limit could result in assuming that an operating node has failed when, in fact, its response is legitimately prolonged. Waiting for a response is clearly not productive; yet it is far better to be temporarily non-productive than to falsely declare a node as failed and stop using it altogether. As a result, reduced performance by incorporating timeout periods is presently accepted in the art as a necessary evil.

OBJECTS AND SUMMARY OF THE INVENTION

The present invention provides, in a fault-tolerant distributed computer system, an improved means for implementing timeouts among computing nodes that process the results of a redundant task. Until the present invention, the plurality of nodes in a redundant computation has not been used to sample the response times statistically. This oversight is remedied in the apparatus and method of the present invention.

One object of the present invention is to provide apparatus and method for using the present behavior of the nodes executing a redundant task to forecast future behavior, thereby abandoning the prior art's reliance on worst-case scenarios.

Another object of the present invention is to provide apparatus and method that reduces the timeout period.

Still a further object of the present invention is to provide apparatus and method that has low computational overhead for recalculating a timeout period.

Briefly stated, the present invention teaches apparatus and method to reduce the duration of timeout periods in fault-tolerant distributed computer systems. When nodes execute a task redundantly and communicate their results over a network for further processing, it is customary to calculate timeouts on a worst-case basis, thereby prolonging their duration unnecessarily. By applying Tchebychev's inequality, which holds for any statistical distribution, to adaptively determine the distribution of the arrival times of the results at the point where further processing of those results takes place, the duration of timeouts is reduced. Successively refining the statistical distribution of the arrival times leads to an improved forecast of future arrivals. Thus timeouts are kept to a minimum without compromising the reliability of the system.

According to an embodiment of the invention, in a fault-tolerant, distributed computer system, apparatus to minimize duration of waiting prior to timeout comprises: a plurality of nodes; each of the nodes being capable of sending at least one message; and a collector effective for processing at least two of the messages received from the plurality of nodes to determine if any of the plurality of nodes is faulty.

According to a feature of the invention, in a fault-tolerant, distributed computer system, a method of minimizing duration of waiting prior to timeout comprises the steps of: attempting to send at least one message from each of a plurality of nodes to a collector; determining at the collector what information is contained in each the at least one message from at least two of the nodes; determining whether any of the plurality of nodes has failed the step of attempting; and acting on the information to determine if any of the plurality of nodes is faulty.

According to another feature of the invention, in a fault-tolerant, distributed computer system, apparatus for minimizing duration of waiting prior to timeout comprises: means for sending at least one message from each of a plurality of nodes to a collector; first determining means for determining at the collector what information is contained in each the at least one message from at least two of the nodes; second determining means for determining whether any of the plurality of nodes has failed to send the at least one message; and means for acting on the information to determine if any of the plurality of nodes is faulty.

These and many other objects and advantages of the present invention will be readily apparent to one skilled in the pertinent art from the following detailed description of a preferred embodiment of the invention and the related drawings.

BRIEF DESCRIPTION OF THE DRAWINGS

FIG. 3 is a stepwise description of one embodiment of the computer system programming for reducing the duration of the timeout period in a fault-tolerant distributed computing system.

FIG. 5 shows representative computational costs in numbers of microprocessor instructions for the types of operations in the present invention.

FIG. 6 is a stepwise description of another embodiment of the computer system programming for reducing the duration of the timeout period in a fault-tolerant distributed computing system.

DESCRIPTION OF THE PREFERRED EMBODIMENT

Figure 1:
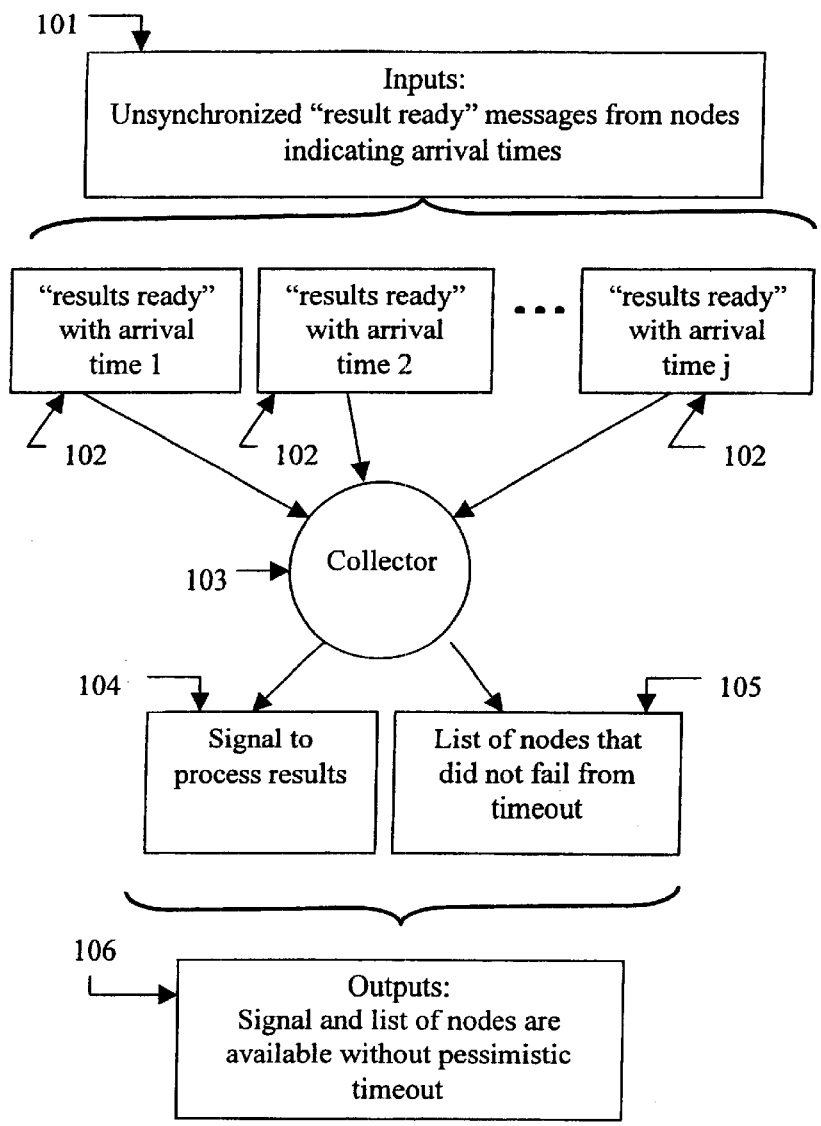
FIG. 1 is a diagram showing the inputs to and the outputs from the collector of the present invention.

In the apparatus and method of the present invention, timeliness of processing the results from a redundant task, and therefore overall system performance, is based on the arrival times of indications that results are ready. The apparatus and method of the present invention is based on forecasting what a process will do. When nodes execute a task redundantly and communicate their results over a network, we do not need a formula for the statistical distribution, f(x), of the arrival times of the results. We can determine the distribution's characteristics from Tchebychev's inequality. It states that the probability a variable x will deviate from its mean by more than k times its standard deviation is equal to or less than $1/k^2$. Tchebychev's inequality holds for any distribution; it therefore applies whether or not f(x) is known.

Factors both internal and external to the distributed system can cause delays at the point where indications come together that results are ready. Such factors are changes in processing load, processor clock drift, and competition for limited resources. Yet, even though f(x) changes, the property given by Tchebychev's inequality continues to hold.

The prior art relies on estimates that assure a high probability of success only by being exceptionally conservative. It chooses a constant timeout d that takes account of a wide variety of possible changes to the distributed system's behavior. The prior art does so because it has no way to take account of the actual circumstances that surround a redundant task. The present invention, on the other hand, is adaptive. It refines the waiting times for outlying result-ready indications based on the statistics of the behavior of each node measured in situ.

Choosing a value for d in the prior art requires a designer's knowledge of the system. To increase their knowledge of the system's behavior, designers experiment to determine the sources and extents of delays. Measuring variations in system behavior can yield an average delay. But computing the standard deviation to determine d from these variations overweighs the worst-case delays that rarely occur. Making d a fixed interval, as in the prior art, makes the worst case extend the duration of every timeout The prior art accepts a fixed value of d as satisfactory throughout the entire task. The present invention, on the other hand, uses the actual distribution of the delays when a task is carried out. In the prior art the standard deviation is calculated before the distributed program even starts. However the standard deviation is determined, were it to be calculated in the present invention as in the prior art considerable computational overhead would be incurred. This additional burden would intrude on the speed of starting to process the results. The present invention substantially reduces this overhead.

In any analysis the sample standard deviation can be replaced by the more readily computed $\bar{R}/d_2^*$, where $\bar{R}$ is the range and $d_2^*$ is a tabular value used whenever the average range replaces the sample standard deviation (see Duncan, *Quality Control and Industrial Statistics*, Fifth Edition, 1986, Page 151). Applying Tchebychev's inequality, not more than $100/k^2$ percent of the cases will fall outside a distance of k standard deviations beyond the mean. A more precise measure of the distribution of result arrivals is obtained as their number increases. With each new arrival that falls within k times $\bar{R}/d_2^*$ beyond the mean limit, another calculation is generated based on the new range. An improved forecast of future arrivals comes from successively refining the statistical distribution of result arrival times.

An incorrect timeout value could cause false indications that one or more nodes have failed. Thus it is important that a decision must not take place prematurely. Specifying a value for the integer k—the number of standard deviations beyond the mean—can limit this risk. In the prior art, d is obtained probabilistically and its value is nonadaptive. It is a worst-case timeout value that does not respond to shifts in the statistical distribution of network and node performance. In the present invention, on the other hand, a value can be chosen for k that is closely related to the overall reliability (also a probabilistic measure) of the fault-tolerant distributed system.

Tchebychev's inequality, as embodied in the present invention, yields a definite, yet controllable, probability of correctly determining a node failure with reduced waiting. Forecasting what a process will do based on its current statistics (including choosing a value for k) is a technique never applied to fault-tolerant computer systems before the present invention. (See Duncan, *Quality Control and industrial Statistics*, Fifth Edition (Irwin, 1986), pp. 106–107, for examples of this technique). In quality control in manufacturing, for example, three standard deviations (i.e., k=3) from the mean can be an acceptable variation.

In the following description, communication from the nodes can be via independent communication channels, as in a point-to-point network configuration, or it can be across a shared communication medium, such as a bus or local area network.

Referring to FIG. 1, inputs 101 are unsynchronized "result ready" messages 102 from nodes. "Result ready" messages 102 arrive at a collector 103 asynchronously. Collector 103 records the time of their arrival. In addition to the binary information that a result is ready, "result ready" messages 102 identify the sending nodes, so the identification of a node from which collector 103 received a "result ready" message 102 is recorded. Collector 103 records the identifications of the responding nodes to form a list of nodes that did not fail due to a timeout 105. When there are n nodes in the distributed computation, then, as shown in FIG. 1, there are at most j (j≦n) "result ready" messages 102. Collector 103 produces, as output, a signal 104 that indicates (1) synchronization of the nodes is complete and (2) the results are ready to be processed. Outputs 106 from collector 103 also contain a list 105 of nodes that did not fail because of a timeout.

Figure 2:
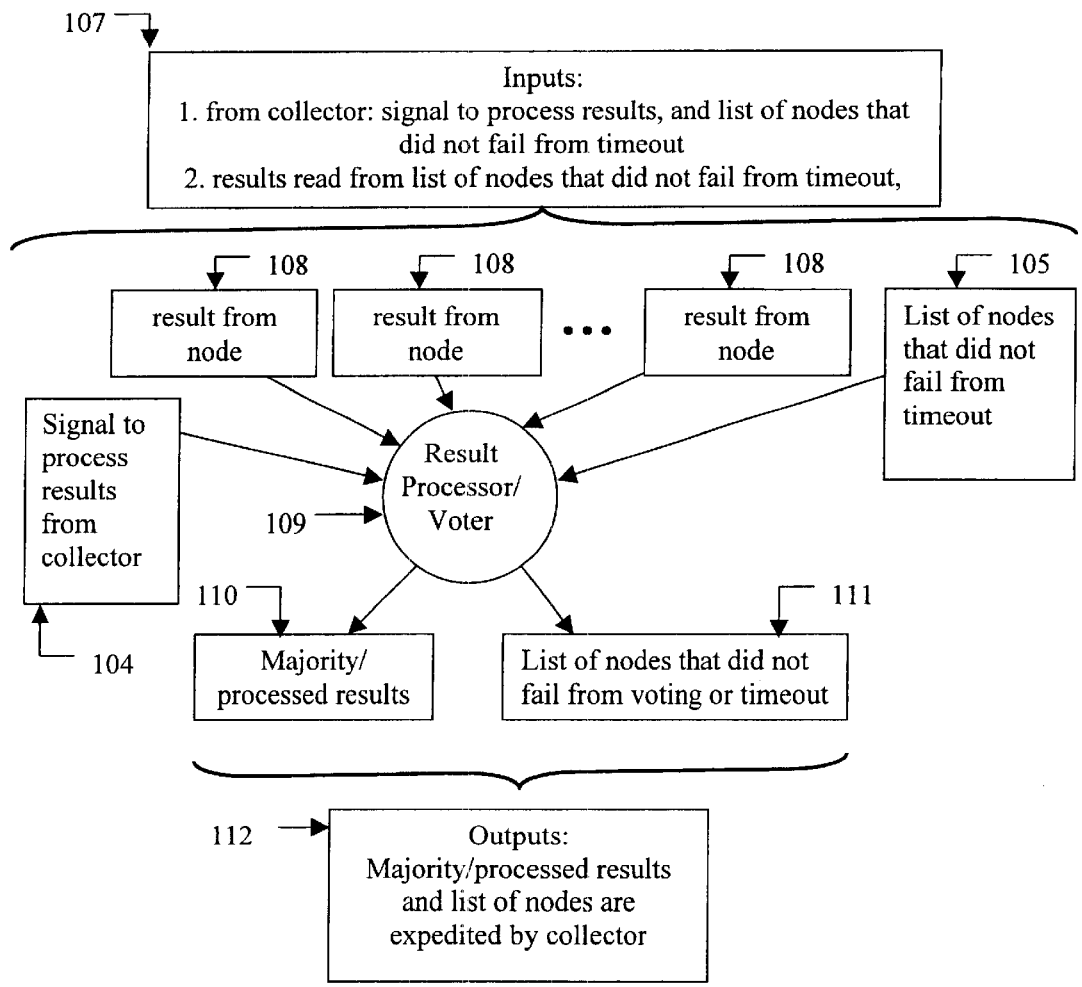
FIG. 2 is a diagram showing the inputs to and the outputs from the result processor/voter of the present invention.

Thus the apparatus and method of the present invention operates in two phases. First, collector 103 gathers "result ready" messages 102 together with their arrival times. Collector 103 also (1) indicates when result processing can continue and (2) lists the nodes that did not fail. Referring to FIG. 2, in the second phase of operation, a result processor/voter 109 accepts collector 103's outputs 106, which become inputs 107. Result processor/voter 109 reads results 108 from nodes that collector 103 listed as having not failed. Once read, the results are processed by result processor/voter 109.

Result processor/voter 109 produces outputs 112 in two parts. First, it produces majority/processed results 110 and a list 111 of nodes that did not fail from voting or timeout. In the case where the present invention tolerates nodes that can fail by producing corrupted data, then result processor/voter 109 produces a majority and list 111 contains those nodes that did not fail from either voting or timeout.

In the present invention, voting is the primary function of result processor/voter 109. The present invention can also be applied to special, albeit non-redundant, distributed computations where timeouts detect faults. Distributed searches are one example. Where a search space is partitioned among a set of nodes that exhaustively inspect their individual spaces to report a number of occurrences, there is no need for a fixed d. In general, if the distributed computation and length of each component's data are the same and fixed timeouts are currently applied, the present invention provides significant gains in performance.

In such a case, result processor/voter 109 anticipates that no result 108 from a node will be corrupted. That is, the distributed computation is not redundant, but the individual tasks performed by the nodes have the same specification for their completion time. Result 108 from each node will be different, but with respect to time each task is redundant.

Hence result processor/voter 109 foregoes producing a majority. Instead it detects nodes that fail to respond. Majority/processed results 110 are thus based on a user-defined function of the partial results obtained. Such a function could be the raising of an exception or a refinement of the partial results. By not having to vote, result processor/voter 109 does not produce a majority in majority/processed results 110, so a list 111 contains only those nodes that did not fail from timeout alone. Outputs 112 in this case are the processed results and a list of nodes that responded within the timeout period.

FIG. 3 describes the present invention in pseudo-code. The statements "process_results (results from working nodes)" supply the signal that operation is transitioning from the collector phase to the result processor/voter phase. Here, the "working nodes" are those that did not time out.

Figure 4:
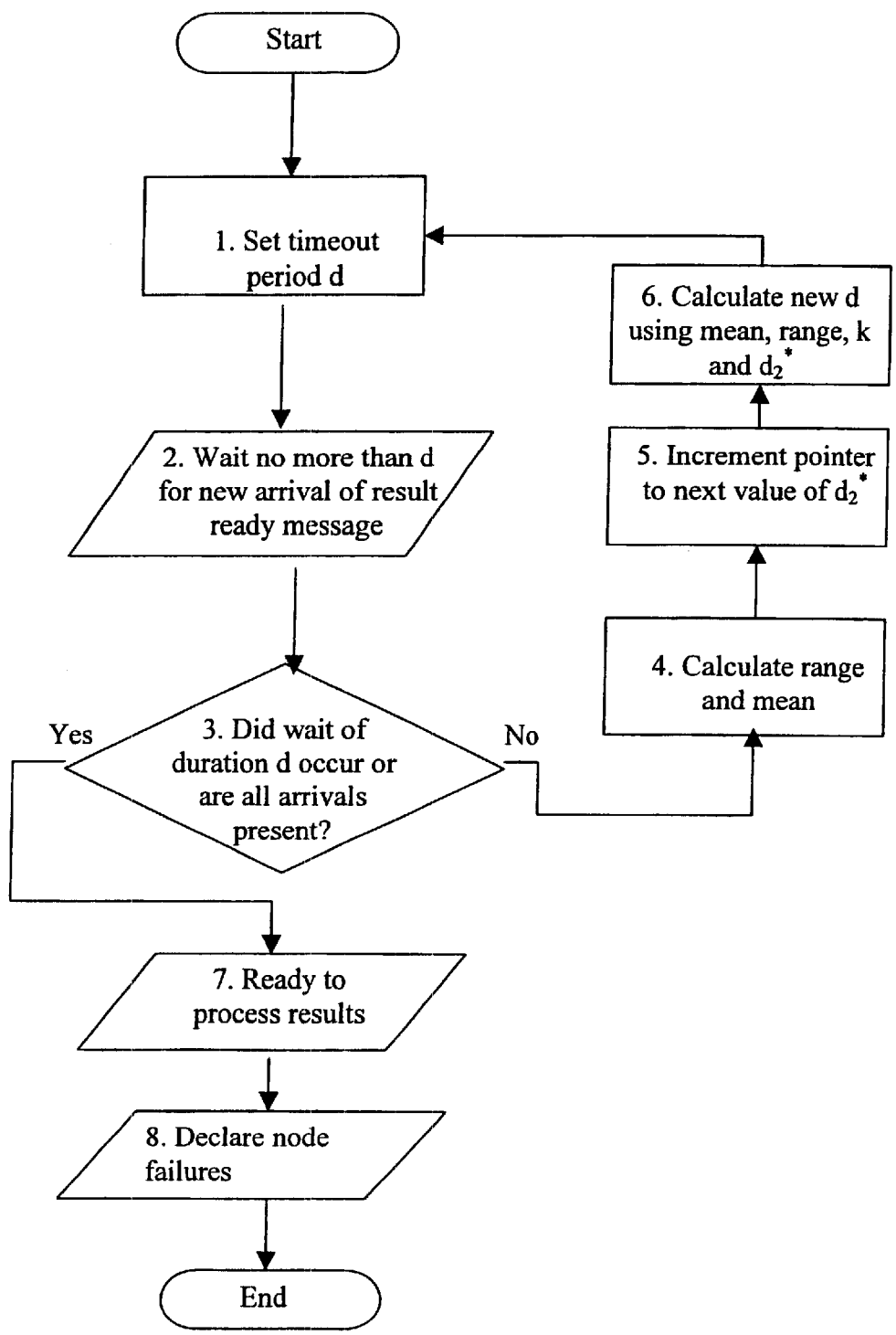
FIG. 4 is a block diagram showing how the present invention iteratively refines the timeout period in the embodiment of FIG. 3.

Referring to FIG. 4, step 1 sets a timeout period based on a fixed d. A plurality of nodes has a majority assumed to be operating properly. This plurality guarantees that there will be another arrival during step 2 well before the period of this initial, conservative d ends. This arrival means that the test in step 3 causes control to flow to step 4. Here begin the steps where more information is gathered about the respondents timeliness to improve the forecast of future responses. In this step the fresh arrival is used to calculate a new range and mean. Each new arrival increases the sample size, so in step 5 a pointer is incremented to point to the next value of $d_2^*$. That is, for each successive sample of the range, the value of $d_2^*$ becomes larger for increasingly refined forecasts beyond the mean.

Refinement of the forecast takes place in step 6, where the new value of d is calculated based on the mean, range, $d_2^*$, and k. Control then returns to step 1, where the previous value of d is replaced with the new one. The new value of d is less conservative. It provides a better limit on the waiting period enforced in step 2. After step 6 the iteration is repeated until, as shown in step 3, either all arrivals are received or a timeout issues. In either event, the results can now be processed as shown in step 7 and the failed nodes declared as shown in step 8.

Because the prior art estimates d so conservatively, the estimate negatively influences system performance. The prior art is thus not forthcoming about the values chosen for d, preferring to conceal the penalty it invokes. Simulating the apparatus and method of the present invention has demonstrated shorter waiting times for future arrivals than with a constant timeout d. The details of the simulations are omitted here because there are no values in the prior-art literature for comparison. But the simulations confirm that the present invention yields improvements. Compared with reasonable estimates of d based on the assumptions described in Cristian (Ibid.), the present invention enables a more timely decision when to commence processing the results. As a result, the redundant task, whose results are to undergo further processing, increases in timeliness.

Referring again to FIG. 3, the present invention omits a range of zero. The present invention has thus far treated time as a continuous quantity. However, time in computers is quantized digitally. In the continuous case the probability of two identical values is zero, because nonzero probabilities exist only for intervals. But, when taken discretely, two different values may actually register as identical because their difference is now immeasurable. Thus one must avoid a zero range (unless one can assume that the results are synchronized). If one can't assume synchronized results, an initial sample of two identical arrival times results in a range of zero, thereby causing processing to proceed without wait. It is therefore necessary to ensure a difference between the first two arrival times.

This problem is easily solved. The values of the two initial samples are tested. If they are the same, then they are offset by an amount that depends on the arithmetic precision of the processor involved.

The advantages of replacing s with the more readily computed $\overline{R}/d_2$ are as follows. To find $\overline{R}/d_2$, we require only two operations: one subtraction (to determine the sample range $\overline{R}$) and one division. The standard deviation s requires many more operations: n+4 multiplications; n additions; two subtractions; one division, and taking one square root. FIG. 3 shows a corresponding list of number of clock cycles per operation for a representative microprocessor architecture (Kwiat et al., "Benchmarking 32-Bit Processors Though Simulation of Their Instruction Set Architectures," *Government Microcircuit Applications Conference Digest of Papers*, November 1990).

Of particular importance is avoiding the square-root operation, which is overly expensive computationally. Those skilled in the art it would regard it as prohibitive. To calculate a new timeout limit for n nodes requires 5×n+56 clock cycles if one uses the standard deviation. Thus the prior art relies predominantly on a fixed timeout d. However, the present invention requires only a fixed number of 17 clock cycles to calculate a new timeout.

Assuming a minimum number of nodes to mask a fault (e.g., n=3), the present invention is at least 4 times faster. As the degree of required fault tolerance increases (e.g., n≧4) then the present invention realizes even higher performance gains. The present invention uniquely applies subtle statistical techniques to distributed-system fault tolerance, thereby adjusting the waiting times. By adapting to changes in network and node behaviors, the present invention permits higher levels of performance than are currently possible with fixed timeouts.

We can extend the apparatus and method of the present invention for additional utility. Applying Tchebychev's inequality makes no assumptions about the sum of the distributions of network and node responsiveness. However, if the total distribution is known to be unimodal, then the Camp and Meidel extension of Tchebychev's inequality (see Duncan, *Quality Control and industrial Statistics*, Fifth Edition, Irwin, 1986, Page 104) increases the invention's usefulness without restricting its application. If the distribution of x is unimodal, the probability that x deviates from its mean by more than k times its standard deviation is equal to or less than $1/2.25k^2$. Applied to the present invention, one again substitutes $\overline{R}/d_2^*$ for the standard deviation.

To make timeouts applicable, one assumes mission-failure semantics for the nodes and the associated network. The failure semantics can be broadened to include failures where a node sends a premature indication that it has results ready. This premature message can make the timeout clock expire before the results from the remaining nodes have been made ready, a potentially adverse outcome. In this case, processing the results means voting on them, and inadvertently excluding any result spoils the voting process. Once more than a majority of "result ready" messages are obtained, voting can commence. For n nodes (assuming n is odd), $]n/2[$ is a majority. After $]n/2[$ nodes have reported "result ready", we assume that at least one node will be in the majority and hence is nonfaulty. Which node is nonfaulty can't be determined until after the vote. But, because all nonfaulty nodes report within d time, the remaining nodes that are nonfaulty must report no later than d time after receipt of $]n/2[$ "result-ready" reports. The drawback is that d time can elapse between each pair of reports until $]n/2[$ arrive. Thus the worst-case total waiting time is $\approx$ d times $]n/2[$.

In another embodiment, the present invention allows for discarding arrival times that are below an acceptable distance from the mean. Referring to FIG. 1, as in the first embodiment, collector 103 in this embodiment forms a list 105 of nodes that have not failed because of timeout. However, in this embodiment nodes that send "result ready" messages 102 at too early a time are also eliminated. That is, they exhibit to collector 103 a behavior that is too timely. Thus collector 103 considers them a departure from those nodes it deems to be working. Therefore collector 103 ignores them as though they had timed out. As in the previous embodiment, collector 103 passes its list 105 of nodes that have not failed because of timeout, together with signal 104 to process results, to result processor/voter 109 shown in FIG. 2. However, in this embodiment collector 103 performs more operations, as it discards arrival times that are below an acceptable distance from the mean in either direction.

Figure 7:
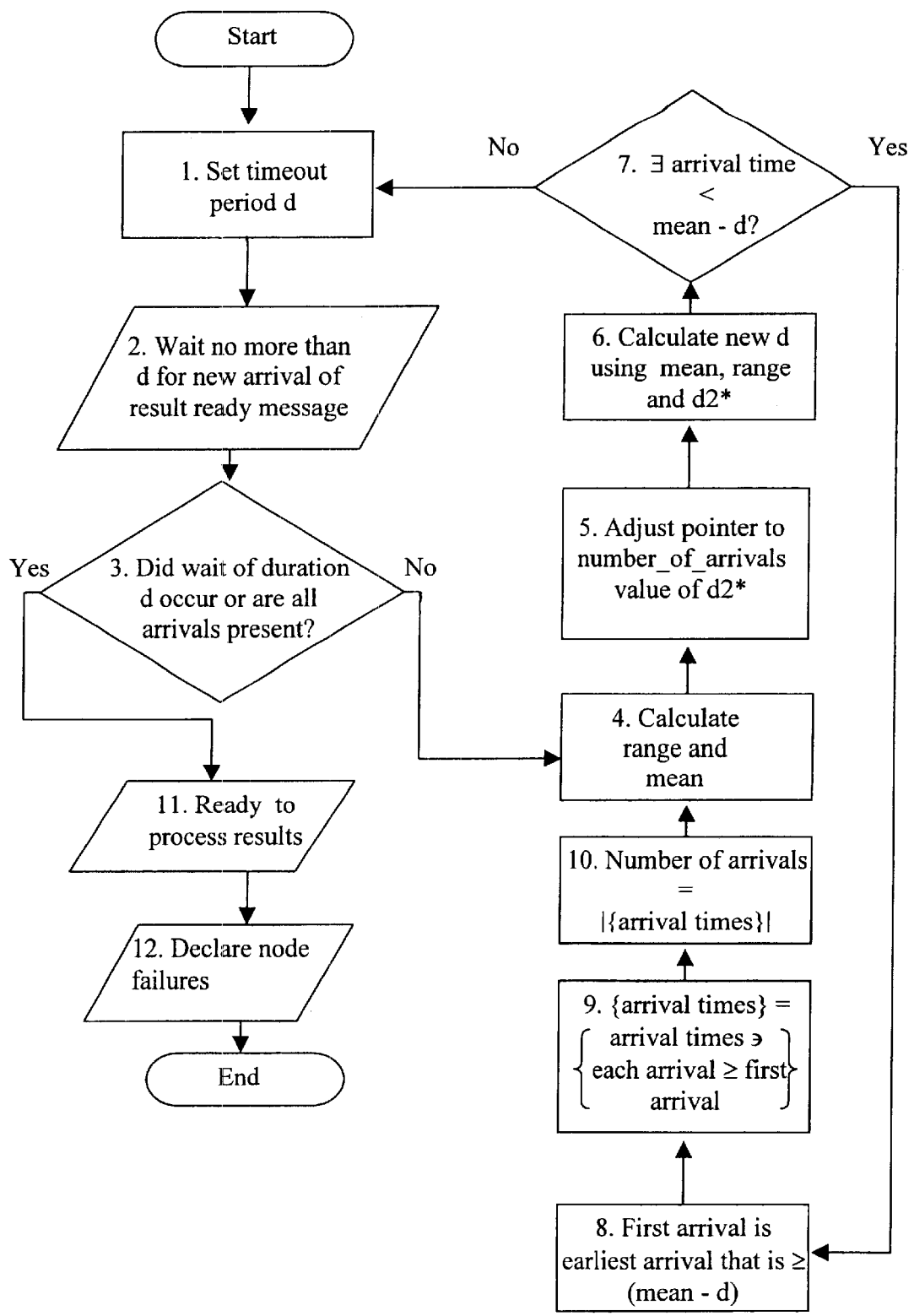
FIG. 7 is a block diagram showing how the present invention iteratively refines the timeout period in the embodiment of FIG. 6.

Referring to FIG. 6, the pseudo-code is the same as in FIG. 3 except for (1) the addition of label "WI", (2) seven lines of code in sequence beginning with "if ∃ arrival time<(mean−d) then . . .", and (3) the penultimate line of code where the set of failed nodes is formed. Referring to FIG. 7, steps 7, 8, 9, and 10 reflect these modifications. Step 7 checks for the existence of an arrival more than d time before the mean arrival time. In step 8, the true first arrival is set to be the earliest arrival in the interval set at d time before the mean. In this embodiment, any earlier arrivals are deemed premature and are discarded. Therefore the set of arrivals must be reduced to include only those that are meaningful. This reduction is step 9, where the set of true arrival times includes only those that fall within the interval. Once the premature arrivals are discarded, the cardinality of the newly formed set of arrivals is calculated in step 10. These steps prepare the basis for a new range and mean, so control resumes at step 4. In step 5, the pointer is adjusted based on the number of true arrivals. The apparatus and method of the present invention in this embodiment recursively refines the set of arrival times. Eliminating all arrivals prior to d time before the mean yields a d that is unbiased by premature arrivals. When, in step 7, no premature arrivals are detected, control flows to step 1 where d is used for the timeout period. Thus premature arrivals do not unduly influence the time spent waiting for future arrivals. This waiting period takes place in step 2. In step 3, the refined timeout period expires or all arrivals are determined to be present. In either event, the results can now be processed as shown in step 11 and the failed nodes declared as shown in step 12.

Clearly many modifications and variations of the present invention are possible in light of the above teachings. It should therefore be understood that, within the scope of the inventive concept, the invention may be practiced otherwise than as specifically claimed.

What is claimed is:

1. In a fault-tolerant, distributed computer system, apparatus to minimize duration of waiting prior to timeout, which comprises:
   a plurality of nodes;
      each of said nodes being capable of sending at least one message;
   a collector effective for processing at least two of said messages received from said plurality of nodes to determine if any of said plurality of nodes is faulty;
      wherein said at least two messages carry information that results are ready;
      said collector is effective to report that a node is faulty when said node does not send a "result ready" message within a chosen time interval; and
      said chosen time interval is determined, after said at least two "result ready" messages have arrived at said collector, from a time difference between a first to arrive "result ready" message and a last to arrive "result ready" message.

2. The apparatus of claim 1, wherein a first plurality of said messages carries information that results are ready;
   a second plurality of said messages carries said results;
   a result processor/voter tallies all messages in said second plurality;
      said result processor/voter is effective to determine a majority from said results; and
      said result processor/voter is further effective to discard any result that falls outside said majority, whereby any node that sent a discarded result is determined to be faulty and excluded from further operation of said system.

3. In a fault-tolerant, distributed computer system, a method of minimizing duration of waiting prior to timeout, which comprises the steps of:
   attempting to send at least one message from each of a plurality of nodes to a collector;
   determining at said collector what information is contained in each said at least one message from at least two of said nodes;

determining whether any of said plurality of nodes has failed said step of attempting;

acting on said information to determine if any of said plurality of nodes is faulty;

wherein said at least one message reports that a result is ready;

said first determining step determines at what time said at least one message arrives at said collector;

said first determining step then calculates a time interval from a difference between a first to arrive "result ready" message and a last to arrive "result ready" message;

said second determining step applies said time interval to determine if a node has failed said step of attempting; and said step of acting reports that said node has failed, thereby permitting further operation of said system without further waiting and excluding said node from said system.

4. The method of claim 3, in which said step of attempting includes two messages in sequence, a first message reporting that a result is ready and a second message reporting said result;

said first step of determining tallies all second messages received from said plurality of nodes and determines a majority therefrom; and said step of acting discards any result that falls outside said majority, whereby any node reporting a discarded result is excluded from further operation of said system.

5. In a fault-tolerant, distributed computer system, apparatus for minimizing duration of waiting prior to timeout, which comprises:

means for sending at least one message from each of a plurality of nodes to a collector;

first determining means for determining at said collector what information is contained in each said at least one message from at least two of said nodes;

second determining means for determining whether any of said plurality of nodes has failed to send said at least one message;

means for acting on said information to determine if any of said plurality of nodes is faulty;

wherein said at least one message reports that a result is ready;

said first determining means determines at what time said at least one message arrives at said collector;

said first determining means then calculates a time interval from a difference between a first to arrive "result ready" message and a last to arrive "result ready" message;

said second determining means applies said time interval to determine if a node has failed to send said at least one message; and said means for acting reports that said node has failed, thereby permitting further operation of said system without further waiting and excluding said node from said system.

6. The apparatus of claim 5, in which said at least one message includes two messages in sequence, a first message reporting that a result is ready and a second message reporting said result;

said first determining means tallies all second messages received from said plurality of nodes and determines a majority therefrom; and said acting means discards any result that falls outside said majority, whereby any node reporting a discarded result is declared faulty and excluded from further operation of said system.

* * * * *